United States Patent
Laible et al.

(10) Patent No.: US 7,860,524 B2
(45) Date of Patent: Dec. 28, 2010

(54) METHOD OF PUSH-TO-TALK SERVICE

(75) Inventors: Volker Laible, Stuttgart (DE); Stefan Wahl, Schwieber-dingen (DE); Dieter Kopp, Illingen (DE)

(73) Assignee: Alcatel Lucent, Paris (FR)

( * ) Notice: Subject to any disclaimer, the term of this patent is extended or adjusted under 35 U.S.C. 154(b) by 906 days.

(21) Appl. No.: 11/358,030

(22) Filed: Feb. 22, 2006

(65) Prior Publication Data
US 2006/0205427 A1    Sep. 14, 2006

(30) Foreign Application Priority Data
Mar. 8, 2005    (EP)    ................................. 05290527

(51) Int. Cl.
*H04B 7/00*    (2006.01)
(52) U.S. Cl. ........................ 455/518; 455/517; 455/519; 455/520
(58) Field of Classification Search .......... 455/517–520
See application file for complete search history.

(56) References Cited

U.S. PATENT DOCUMENTS

| | | | |
|---|---|---|---|
| 2003/0012149 A1* | 1/2003 | Maggenti et al. | ............ 370/260 |
| 2004/0052339 A1 | 3/2004 | Mirashrafi et al. | |
| 2004/0192364 A1 | 9/2004 | Ranalli et al. | |
| 2005/0111432 A1* | 5/2005 | Ekstrom et al. | ............. 370/350 |
| 2005/0245240 A1* | 11/2005 | Balasuriya et al. | ........ 455/414.1 |
| 2006/0178138 A1* | 8/2006 | Ostroff et al. | ............ 455/426.1 |

* cited by examiner

*Primary Examiner*—Edward Urban
*Assistant Examiner*—Fayyaz Alam
(74) *Attorney, Agent, or Firm*—Fay Sharpe LLP (57) ABSTRACT

The invention concerns a method of providing a Push-to-Talk (=PTT) service within one or more telecommunication networks (1, 2, 3, 4) by means of a gateway-server (5) which sets up a virtual connection per PTT connection. The virtual connection provides information about the participating terminals (10, 20, 30, 40) of the PTT connection, the service type to reach each terminal (10, 20, 30, 40), and the connection status of each terminal (10, 20, 30, 40). Thus, the gateway-server (5) is capable of providing the PTT service within and/or across different telecommunication networks comprising radio access telecommunication networks (1), fixed wire-line telecommunication networks (2), circuit-switched telecommunication networks (3), and packet-switched telecommunication networks (4).

17 Claims, 3 Drawing Sheets

METHOD OF PUSH-TO-TALK SERVICE

TECHNICAL FIELD

The invention relates to a method of providing a push-to-talk (=PTT) service as well as a gateway-server for executing this method.

The invention is based on a priority application, EP 05290527.0, which is hereby incorporated by reference.

BACKGROUND OF THE INVENTION

PTT, sometimes also called push-over-cellular (=PoC), allows a user of an enabled device to transmit a message, in particular a voice message, instantly and simultaneously to one or more other users of PTT-enabled devices. It is often compared to a walkie-talkie with a vastly extended coverage area, thanks to the use of cellular or wireless telecommunication networks. Today, there are discussions to implement PTT functionality in IP-phones and other mobile devices (IP=Internet Protocol). The "always-on" function of the General Packet Radio Service (=GPRS) permanently keeps up the connection in the background to provide for a swift dial-up. The user's voice message is converted to a data stream and usually transported across a mobile operator's data network to a PTT server, using standard Voice over Internet Protocols (=VoIP). From there, the data streams are forwarded to the receiving users.

US 2004/0192364 A1 describes the provision of a PTT service between a wireless phone locally registered for a PTT service and a PTT-enabled computer that is not registered with any network operator's PTT service. The unregistered network computer with PTT functionality has its PTT address recorded with a Directory Service and is assigned a unique ID by the Directory Service. Then a PTT connection can be established by entering the unique ID at the wireless phone. A PTT server upon reception of the unique ID queries a PTT address for the destination computer from the Directory Service and forwards the PTT request to the unregistered computer. Thus, the number of available PTT destinations is expanded to devices unregistered to a PTT service.

Generally, PTT services are similar to Voice Instant Messaging which is a voice enabled IM solution for conducting IM connections from any wireless or wire-line phone, via voice (IM=Instant Messaging). Users can find out which of their buddies are online, record and send voice instant messages to individuals or buddy groups, and listen to incoming messages that are converted to text and read by an application. To ensure immediate communication, Voice Instant Messaging utilizes standard protocols such as SIP and RTP (SIP=Session Initiation Protocol; RTP=Real-Time Transport Protocol).

SUMMARY OF THE INVENTION

It is the object of the present invention to improve the provision of PTT services. The object of the present invention is achieved by a method of providing a PTT service within one or more telecommunication networks, the method comprising the steps of requesting one or more concurrent PTT connections between subscribers of the PTT service, setting up a virtual connection per PTT connection by means of a gateway-server providing the PTT service within a circuit-switched telecommunication network, whereby each virtual connection provides information about the terminals participating in the PTT connection, the service type to reach each terminal, and the connection status of each terminal, generating media streams by a terminal of one of the subscribers of the PTT connection and sending the media streams to the gateway-server, identifying the virtual connection corresponding to the received media streams by the gateway-server, and sending out the media streams to one or more of the other terminals participating in the PTT connection according to the determined virtual connection. The object of the present invention is further achieved by a gateway-server for providing a PTT service, the gateway-server comprising an interface to a circuit-switched telecommunication network and a control unit for setting up a virtual connection per PTT connection upon a request for one or more PTT connections between subscribers of the PTT service, whereby each virtual connection provides information about the terminals participating in the PTT connection, the service type to reach each terminal, and the connection status of each terminal, for identifying the virtual connection corresponding to media streams received from a terminal of one of the subscribers of the PTT connection, and for sending out the media streams to one or more of the other terminals participating in the PTT connection according to the determined virtual connection.

A PTT connection in the sense of this invention means the entirety of devices, switching units, physical connections and transport paths which enable pieces of information to get transmitted within a PTT context from a sender to a receiver. A virtual connection concerns the entirety of information which enables PTT media streams to be communicated via the PTT connection among a defined circle of participants of a PTT connection, in short: PTT participants. The virtual connection concerns questions like, e.g., the devices used to generate, send and receive PTT communication content, the content type (text, voice, video, data, . . . ), the type of telecommunication networks these devices are logged in and the used protocols of these networks, the participants of a PTT communication (telephone number, IP address, SIP address, MAC address, . . . ), the connection status with regard to each participant (active, interrupted, passive, online, offline, . . . ), Quality of Service, service preferences predefined by the participants, and other associated issues, a part of which may be summarized with the term "service type" (SIP=Session Initiation Protocol). The virtual connection usually is associated to a specific PTT connection, i.e., the entirety of interrelated PTT information exchanged among a defined group of participants connected over a PTT connection.

BRIEF DESCRIPTION OF THE INVENTION

The current invention enables legacy phones like, e.g., analog POTS, ISDN, DECT/PWT, "old" GSM, and PBX phones and services like, e.g., SMS, MMS, IM, and VoIP to participate in PTT services (POTS=Plain Old Telephone System; ISDN=Integrated Services Digital Network; DECT=Digital Enhanced Cordless Telecommunication; PWT=Personal Wireless Telecommunication; GSM=Global System for Mobile Communications; PBX=Private Branch Exchange; SMS=Short Message Service; MMS=Multimedia Message Service). "Old" GSM phones here is meant to denote GSM phones which have not an integrated VoIP based PTT functionality. Thus it is possible to communicate via PTT from a fixed phone or an "old" GSM mobile phone to mobile devices or IP phones already equipped with PTT functions.

The gateway-server of the present invention supports media streams comprising audio, video, voice, text, and data streams and any mixture thereof within one PTT connection, e.g., allowing also a push-to-video service.

The present invention provides a multitude of phones with PTT services which otherwise would never have access to PTT. For example, using a regular analog phone line to connect to PTT would mean being constantly connected and just muting the microphone. In this case, the phone still operates in real time full duplex mode. The caller still gets billed for a regular phone call even when the phone is muted. Depending on the configuration, incoming calls would receive a busy signal or would be routed to a voice mailbox. Moreover, it is difficult to implement PTT directly in a phone. The present invention avoids this difficulty by implementing PTT as a new service in a telephone network.

Further advantages are achieved by the embodiments of the invention indicated by the dependent claims.

According to a preferred embodiment of the invention, the PTT media streams are processed, logged and saved in a memory for further reference. This is an important feature, e.g., in case a PTT participant is currently unable to follow a PTT connection and wishes to receive the information later. Beside the media streams, it is possible that information associated with the PTT media streams is also logged and saved in a memory. These data may comprise part of or all of the information provided by the virtual connection.

Preferably, the gateway-server receives and stores media streams from a subscriber. The gateway-server may also log and store data concerning the origin of the media streams and the start and end time of reception of the media streams. All these data are essential parts of PTT connection data stored in the memory of the gateway-server. The PTT connection data may also comprise additional data which are related to the PTT connection.

It is also possible that a single user is participating at the same time in several concurrent PTT connections because the gateway-server is adapted to log and store simultaneously multiple concurrent PTT connections for every subscriber. Other than prior art PTT technology where the data connection is restricted to exactly one user, the gateway-server of the present invention is non blocking, i.e., it enables two users of the same PTT connection to send their media streams simultaneously. Before generating media streams for transmission to the gateway-server, a subscriber simultaneously participating in two or more concurrent PTT connections has to select the virtual connection he wants to contribute the media streams to. The gateway-server receives the selection and is enabled to assign the received media streams to the correct virtual connection.

According to a preferred embodiment of the invention, a PTT connection can be suspended individually for each PTT connection participant for executing, i.e., sending or receiving, other telecommunications like, e.g., a telephone call, an SMS, voice mail. During a PTT connection, a subscriber's communication device is continuously monitored by the PTT gateway-server for incoming calls and, in the case of a call, the subscriber is accordingly informed. For example, a user receiving a PTT call on his phone is indicated an incoming telephone call at his phone. He may choose to suspend the PTT connection to answer the incoming telephone call and indicate the decision to suspend the PTT connection by transmitting a signal to the gateway-server. Accordingly, the gateway-server stops to transmit PTT connection data and sets a marker where it has stopped.

After the user has finished the incoming telephone call, the gateway server may immediately resume transmitting the PTT data beginning from the marker to the user. It is also possible that the gateway-server is triggered by a signal from the user to resume the transmission. Similarly, a user generating a PTT call may realize while speaking that he has forgotten to look up information needed for the call. He may suspend the PTT call to look up the information, and then resume the PTT call at the point where he has interrupted.

According to a preferred embodiment of the invention, the PTT service is provided within and/or across telecommunication networks of different technology. These networks may comprise radio access telecommunication networks, fixed wire-line telecommunication networks, circuit-switched telecommunication networks, and packet-switched telecommunication networks, in particular also networks which do not natively support SIP and RTP.

The PTT gateway-server sets up a virtual connection per PTT connection. Each virtual connection consists of a participant/connection list whereby the connection list holds all the participants of the PTT connection and describes the service to reach each PTT participant and their connection status, e.g., active, interrupted, passive, not online, etc. Thus, the PTT gateway-server identifies who is currently active in the PTT connection, reads the service type of each participant from the connection list and correspondingly converts the media stream into a format appropriate for the respective service type. In order to perform any adaptations of modality and format (text to speech, analog to digital, . . . ), the PTT gateway-server is connected to different application servers.

It is further possible that the PTT service is provided to a telephone set, preferably a POTS telephone. POTS phones are designed for PSTN communication (PSTN=Public Switched Telephone Network). To provide the POTS with an interface to the PTT service without allocating the POTS to a PTT connection only, a user may press a programmed button or dial a programmed number to set up the connection to the PTT gateway-server. Alternatively a direct call feature may be used which automatically dials a number, here the number of the PTT service, as soon as the user lifts the headset. Then the user has to select at a menu either to start a PTT connection or to set up another usual telephone connection. In a third alternative, a feature may be used that connects the user to a programmed number, here the number of the PTT service, if he does not start dialing within a predefined time interval.

It may be advantageous that a subscriber identify himself to the gateway-server before he is allowed to set up a PTT connection. This identification and authentication may be executed, e.g., via biometric methods (speech recognition, fingerprint scan, handwriting characteristics, etc.) or via a PIN (input at the dial-pad, stored on a telephone chip, inserting a smart card, etc.). Similarly, it is possible that each subscriber participating in a PTT connection signs his corresponding media streams with a personal digital signature before they are sent to the gateway-server. Alternatively, each subscriber participating in a PTT connection signs the media streams logged and stored in the gateway-server and comprising an entire communication of a PTT connection with a digital signature before they are distributed to the participating subscribers. The digital signatures assigned to the media streams authenticate the originality of the media streams.

A user of a terminal, in particular of a POTS phone, may also be presented a menu for choosing at the terminal the other PTT subscribers he wants to communicate with. In a preferred embodiment, the gateway-server has been provided in advance from the user with a list of potential communication destinations (subscriber names, PTT groups, telephone numbers, etc.) which is read to him in the menu and from which he chooses his communication partners. In case the subscriber participates in several concurrent connections he may select at the menu the virtual connection he wants to contribute media streams to. The menu may be voice-activated, key-activated, or based on another type. The subscriber's choice may be indicated, e.g., by voice or via pressing a key on the dial-pad.

A PTT button being absent in the case of legacy phones, the two following methods are possible to create a PTT voice stream. In an alternative using VAD, the gateway-server first buffers the voice signal input from the subscriber, then determines the PTT signal by defined silent pre- and hangover time (VAD=Voice Activity Detection). Another method relies on a key, preferably a DTMF signal, which is pressed to signal the start/end of an utterance (DTMF=Dual Tone Multiplexed Frequency). The signal between the two tones will be processed as PTT signal. Also a combination of both methods is possible.

Some advantages are achieved if the gateway-server allows individual navigation within the logged and stored PTT connection data of one or more PTT connections. A user may browse PTT streams of PTT connections he is participant of by skipping logged PTT connection data and/or replaying sequences of the PTT media stream and/or assigning individual markers to important sequences of the PTT media stream so that he can quickly find and replay the sequence. This may be particularly useful, e.g., for lawyers and traders because the logged PTT connection data form an easily and all the time accessible protocol of negotiations and interrogations.

According to a preferred embodiment of the invention, the transmission of PTT signals from gateway-server to a user is triggered by a trigger signal from the user. Thus, the gateway-server provides PTT connection data also to communication partners which follow with time shift relative to the other PTT participants.

It is possible that the gateway-server logs and stores an entire PTT connection but it is also possible, to reduce the storage load at the gateway-server, that it only logs and stores the PTT connection data as long as a member of a PTT connection group is not actively participating. For example, a group of PTT subscribers has begun to execute a PTT connection when one member suspends the PTT connection to answer another call. Then the gateway-server may only log and store the PTT connection during the time one of the PTT connection members is not participating. This limited logging and storing function may be set at the gateway-server by the subscribers.

It is advantageous that the media streams associated with a PTT connection are sent out from the gateway-server to the subscribers in the correct sequence, i.e., in the chronological order according to the receive start time of the talk streams. In case a user is participant of several PTT connections, it is possible that the stream sequences are transmitted to the user according to the receive start time of the streams, independent of the PTT connection. This enables the user to keep up-to-date with regard to the current state of communication within several concurrent PTT connections. It is also possible, e.g., in case a subscriber of multiple PTT connections listens later to media streams, that first all the media streams of a certain PTT connection are replayed in their chronological order, after that all the media streams of a second PTT connection, and so on. This is especially helpful to thoroughly follow the thread of a communication.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE INVENTION

Figure 1:
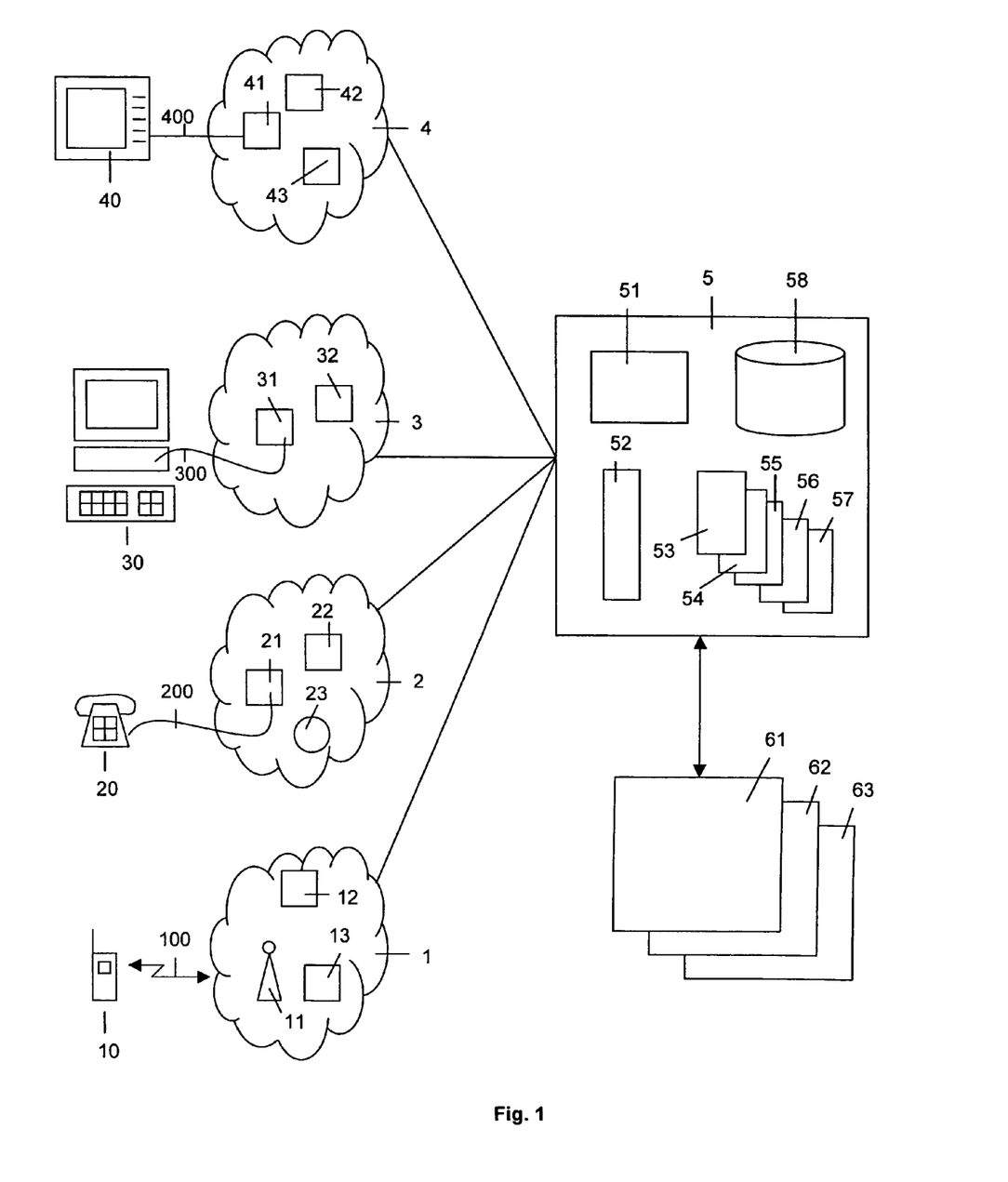
FIG. 1 is a block diagram of a system for providing a PTT service according to a first embodiment of the invention.

FIG. 1 shows telecommunication networks 1 to 4, terminals 10, 20, 30, 40, a PTT gateway-server 5, and application servers 61, 62, 63.

The telecommunication networks 1 to 4 comprise a radio access communication network 1 which provides a wireless communication service, a circuit-switched communication network 2, a packet-switched network 3, and a television broadcast network 4. Preferably the communication network 1 is a cellular radio network, for example a GSM or a UMTS network, comprising a Base Transceiver Station (BTS) 11, a Base Station Controller (BSC) 12, and a Mobile Service Switching Centre (MSC) 13 (UMTS=Universal Mobile Telecommunications System).

Preferably the communication network 2 is a fixed wireline network, e.g., a PSTN network or an ISDN network, optionally equipped with additional functionalities and network elements to implement IN service architecture (IN=Intelligent Network). In case the communication network 2 is a PSTN/ISDN network, it will comprise, e.g., exchanges 21, 22. In case the communication network 2 is of an IN architecture, these exchanges 21, 22 comprise additional service switching functionalities and are represented as Service Switching Points (SSP) 21, 22, extended by a Service Control Point (SCP) 23. The gateway-server 5 is adapted to co-operate with the service logic of the SCP 23. Therefore, the service provided by the IN architecture and the PTT service provided by the gateway-server 5 are combined.

Preferably the communication network 3 is a TCP/IP network, e.g., forming a part of the Internet, comprising a softswitch 31 and a router 32 (TCP=Transmission Control Protocol). And the communication network 4 preferably is a digital television network, e.g., a DVB-S network, comprising a satellite dish 41, a relay satellite 42, and a ground station 43 (DVB-S=Digital Video Broadcast–Satellite).

According to a further embodiment of the invention, the communication networks 1 to 4 are formed by different sub-networks. For example, the packet-switched network 3 is formed by different sub-networks capable to exchange IP-based traffic like a LAN, a wireless LAN, and a private data network (LAN=Local Access Network).

The PTT gateway-server 5 as well as the application servers 61, 62, 63 are constituted by one or several interlinked computers, a software platform and various application programs executed on the system platform provided by the aforementioned hard and software platform. The functionalities of the gateway-server 5 and the application servers 61, 62, 63 are performed by the execution of these software components by the hardware components of the gateway-server 5 and the application servers 61, 62, 63, respectively. From a functional point of view, the PTT gateway-server 5 comprises a control unit 51, an interface unit 52, auxiliary units 53 to 57, and a database 58.

The database 58 contains a subscriber data set for each individual user of the PTT service provided by the PTT gateway-server 5. Each subscriber data set contains contact data of the respective user, for example a network address, an IP address, or a SIP address of a terminal 10, 20, 30, 40 assigned to the respective user. Further, the subscriber data set contains subscriber data specifying, for example, the name of the respective subscriber and a subscriber profile assigning the respective subscriber to one or more PTT groups. The database 58 is adapted to store PTT media streams and associated virtual connection data in a memory for further reference. Optionally, the subscriber data set contains authentication information used to check the access rights of the terminals 10, 20, 30, 40 while contacting the push-to-talk gateway-server 5.

The auxiliary units 53 to 57 comprise an administration unit 53 which provides an access interface to enrolled subscribers of the push-to-talk service which enables these subscribers to change and administrate their subscriber data stored in the database 58.

The control unit 51 establishes communication channels between the terminals 10, 20, 30, 40 based on a PTT call request received from these terminals 10, 20, 30, 40. Generally, the control unit 51 manages and administrates the functions of the gateway-server 5.

The interface unit 52 comprises interfaces for sending and receiving data to/from the different communication networks 1 to 4. The auxiliary units 53 to 57 further provide a variety of auxiliary functions like format conversion functions, identification functions, authentication functions, logging functions, replaying and record navigation functions, etc. as part of the overall functionality of the gateway-server 5.

The application servers 61, 62, 63 co-operate with the PTT gateway-server 5 to perform any modality adaptations (text to speech, . . . ) by appropriate software applications.

The terminals 10, 20, 30, 40 comprise a GSM mobile phone 10 without a specific PTT functionality logged in the radio access communication network 1, a POTS telephone set 20 and an ISDN phone 20, respectively, wired with the circuit-switched communication network 2, a computer terminal 30 connected to the packet-switched network 3, and a TV set 40 served by the TV network 4. In any case, the presentation of information from the gateway-server 5 to the terminals 10, 20, 30, 40 and vice versa like, e.g., setting up a PTT conversation or administrating PTT groups or subscriber data sets at the terminal depends on the display capabilities of the terminal.

A user of the terminal 20 wishes to initiate a PTT connection with three other participants using the terminals 10, 30, 40. In the case of PTT-enabled terminals, the initiating may be executed by pressing a specific "PTT-button" of the terminal 20. In the case of a legacy terminal without explicit PTT function, a connection may be automatically established between the gateway-server 5 and the terminal 20 as soon as the user of the terminal 20 lifts the telephone receiver or the headset or if the user has not started dialing after a predefined number of seconds.

This is achieved by the co-operation of the gateway-server 5 and the SCP 23 representing the IN service logic. On a control level, the gateway-server 5 and the SCP 23 communicate via the INAP protocol to establish the automatic dial service for set-up of a PTT connection. The SCP 23 communicates via INAP with the SSPs 21, 22 to set up a trigger point. In case the telephone receiver of the terminal 20 is lifted, a direct data connection between the terminal 20 and the gateway-server 5 for the transmission of the media streams is established. Alternatively, the SSPs 21, 22 may query via INAP from the SCP the commands to be executed upon registering the lifting of the telephone receiver of terminal 20.

Then the SCP 23 sends the appropriate trigger commands to the SSPs 21, 22 to establish a direct data connection between the terminal 20 and the gateway-server 5 for the transmission of the media streams.

In another embodiment, the terminal has been programmed to dial the number of the gateway-server 5 when one or more buttons are pressed, e.g. a specific PTT keypad combination like, e.g., *789#. The gateway-server 5 may identify the identity of the caller (so-called call-screening), e.g., via an authentication unit 55.

Then the initiating caller is prompted by the gateway-server to indicate the participants of the PTT connection. When using phones without a display one cannot directly get presence information, e.g., the user does not see if someone is online or if he is in PTT mode. Either voice activated or by pressing a key on the dial-pad, the initiating user may be presented a menu by the gateway-server 5 where he can choose the other participants of the PTT connection. A list of potential participants, of pre-set groups of PTT communication partners (so-called "buddy lists"), or of virtual connections may be read to him based on his subscriber data set stored in the database 58. The user may also receive status information (online, PTT mode, etc.) on communication partners.

In case of multiple PTT connections of the user, the gateway-server 5 first offers a menu of the active connections. The presentation of the menu depends on the display capability of the user's terminals; in the case of a POTS telephone, the menu may be presented using, e.g., a speech interface. The menu can be user-defined with user-defined connection names and connection sorting. Connection selection can be done either using a DTMF tone, by pressing a single phone button, or a spoken identifier, e.g., a number or a connection name. The user needs not wait until the menu is completely offered but can immediately or at any time during the menu select the connection.

The PTT-initiating user of terminal 10 may invite all the other participants and is billed for the whole PTT connection (so-called single site accounting). The invitation process is supported by the gateway-server 5 by using directory features of former PTT-connections or PTT participants, accessing Rich Presence servers, allowing the modification of PTT connections at any time during the connection, allowing the pre-initiation using a web-interface, and allowing the initiating participant at any time of the connection to invite a further user or to disinvite a participant.

Further, it is possible that the gateway-server 5 enables a user who is not participating in a PTT connection to ask via the gateway-server 5 for joining the PTT connection, a so-called knocking at the PTT connection. Then the inviting participant can accept or reject him. To veil a PTT connection to a third party, the PTT connection can be set at the gateway-server 5 to be visible or invisible to non-invited users. Besides the mentioned single site accounting initiating, an account sharing is possible where an initiating participant invites all the others but each participant is asked to take over his bill individually.

After the connection selection is acknowledged or in case of a single connection, the initiating user can immediately speak his message which is buffered by the gateway-server 5. The buffered voice stream is terminated at connection release, i.e., as soon as the user releases the pushed button or hangs up his phone. It is possible that the gateway-server 5 recognizes the PTT voice streams by either of two methods. By an automatic generation method using VAD, the gateway buffers the voice signal input, determines the begin and end of the relevant PTT voice streams based on VAD and a defined voice pre-pause and voice hangover time, and generates a PTT signal. Alternatively, a key—in particular a DTMF-signal—is pressed to indicate the start/end of an utterance. From the voice input between the two tones, a PTT signal will be generated.

It may be advantageous that the buffered media streams are re-sent from the gateway-server 5 to the subscriber's terminal 10, 20, 30, 40 in order to provide the subscriber with the possibility to check the buffered media streams. This is particularly favorable if the generation of the media streams is prone to errors, e.g., when using the VAD based generation in a noisy environment. If the subscriber is comfortable with the content of the buffered media streams he acknowledges the authenticity of the media streams by means of a digital signature. The methods of signing an electronic content with a digital signature are sufficiently known, e.g., from emailing, anti-virus software, or pay TV. The digital signature authenticates the originality of the media streams. The signing with a digital signature can be executed online or offline. The gateway-server 5 attaches the digital signature to the media streams and sends the media streams together with the attached signature out to the PTT communication partners. This indicates to the PTT communication partners the authenticity of the media streams received from the gateway-server 5.

The gateway-server 5 sets up a virtual connection per PTT connection. Each virtual connection consists of a participant/connection list which holds all the PTT participants, describes the service to reach each PTT participant and the respective connection status of each participant (active, interrupted, passive, not online, following, etc.). A part of the information provided by the virtual connection may be retrieved from the subscriber data set stored in the data base 58, a part may be signaled from the participants/terminals, a part may be available from the network operators serving the PTT participants.

The gateway-server 5 utilizes the information of the virtual connection to provide the PTT media streams to each participant according to their connection status and service type. For example, the control unit 51 triggers a conversion unit 54 of the gateway-server 5 to convert the media streams into the appropriate format of the service type, e.g., into the format adapted to a participant's terminal and used communication network.

In a preferred embodiment of the invention, the gateway-server 5 processes each PTT connection individually, logs data like the communication content, the connection participants, and the connection start and end time with the help of a logging unit 56, and stores the data in a memory 58 of the gateway-server 5.

Furthermore, it is possible that the gateway-server 5 allows that more than one PTT participant send their voice streams simultaneously. The gateway-server 5 receives the voice streams from different participants, stores them and sends the voice streams out to the respective destination participants according to the receive start time of the streams.

The gateway-server 5 identifies who is currently active in the PTT connection. The service type of each participant is retrieved from the connection list. Then a connection to each active participant is established for the time required to play all the new received streams to each participant. To facilitate the identification of each voice stream, the originators' names are always mentioned with the streams. Moreover, also the receive time of the media streams, the corresponding buddy group, and the associated group members may be provided to each participant of a PTT connection. Talk streams are always sent in the correct sequence to the participants.

The delay between receiving a voice stream at the gateway-server 5 until distributing this voice stream to the PTT destinations is generally about or less than a second. The media streams may be presented to the PTT communication participants with a specific PTT signal to attract their attention. A voice stream may be provided with the prepended information on the originator and the time, or on a terminal set with a display, the buddy list and the person will be shown on the display while the message of this person is sent. In the case of legacy phones with hands-free capabilities and auto-answering the media streams may be immediately played with a prepended jingle.

Figure 2:
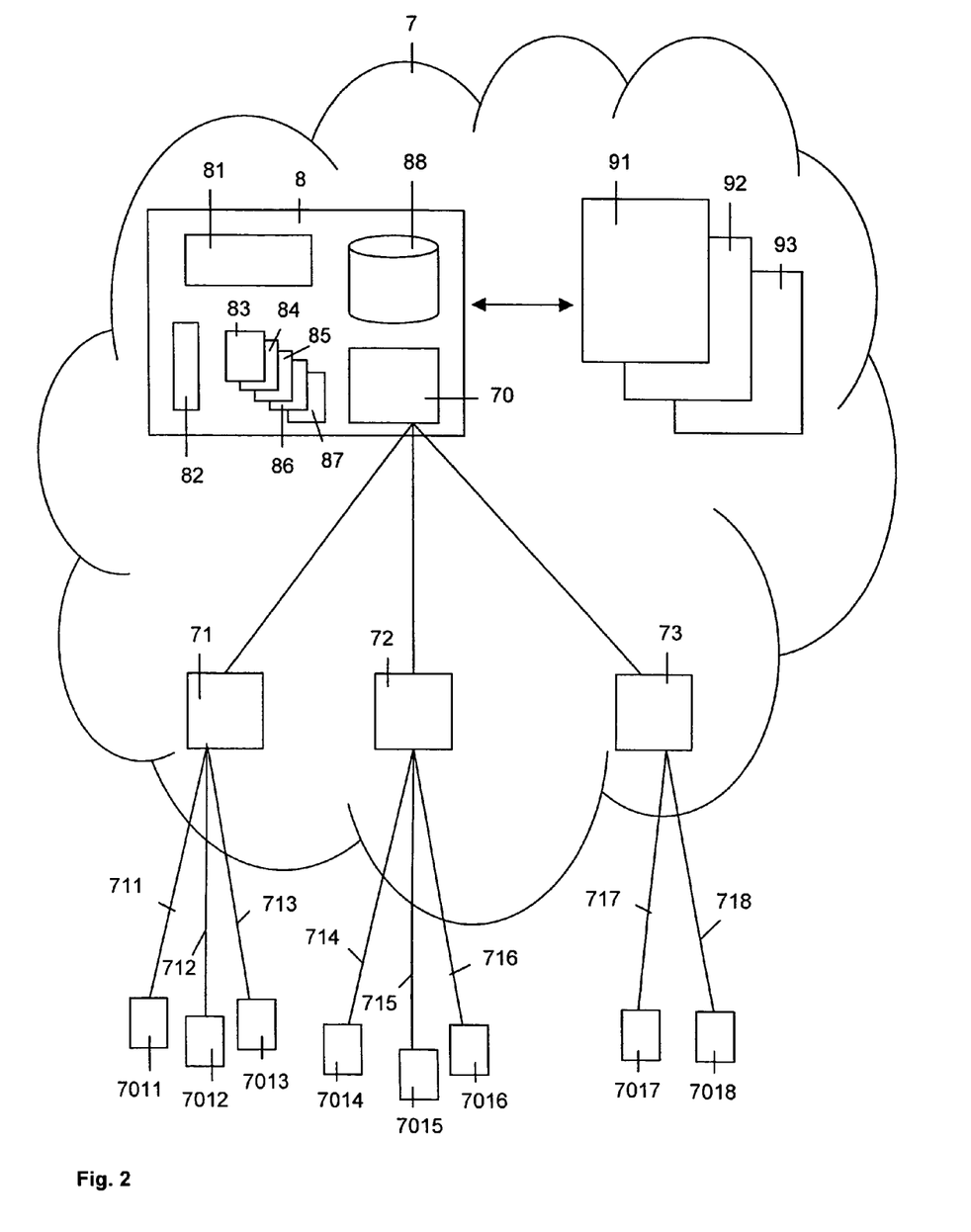
FIG. 2 is a block diagram of a system for providing a PTT service according to another embodiment of the invention.

According to another embodiment of the invention, FIG. 2 shows a PSTN/ISDN network 7 with IN architecture which comprises a gateway-server 8 with integrated IN functionality, Service Switching Points (SSP) 71, 72, 73, terminals 7011 to 7018, and application servers 91, 92, 93.

The gateway-server 8 comprises a control unit 81, an interface unit 82, auxiliary units 83 to 87, a database 88, and an IN service control unit 70 with a functionality equivalent to a stand-alone Service Control Point (SCP). The IN service control unit 70 communicates with the SSPs 71, 72, 73 via the INAP protocol (INAP=Intelligent Network Application Protocol). The integration of the SCP functionality into the PTT gateway-server 5 ensures the mergence of PTT and IN functionality into one powerful service. Concerning the processing of a PTT call, reference is made to the detailed description given with FIG. 1.

Figure 3:
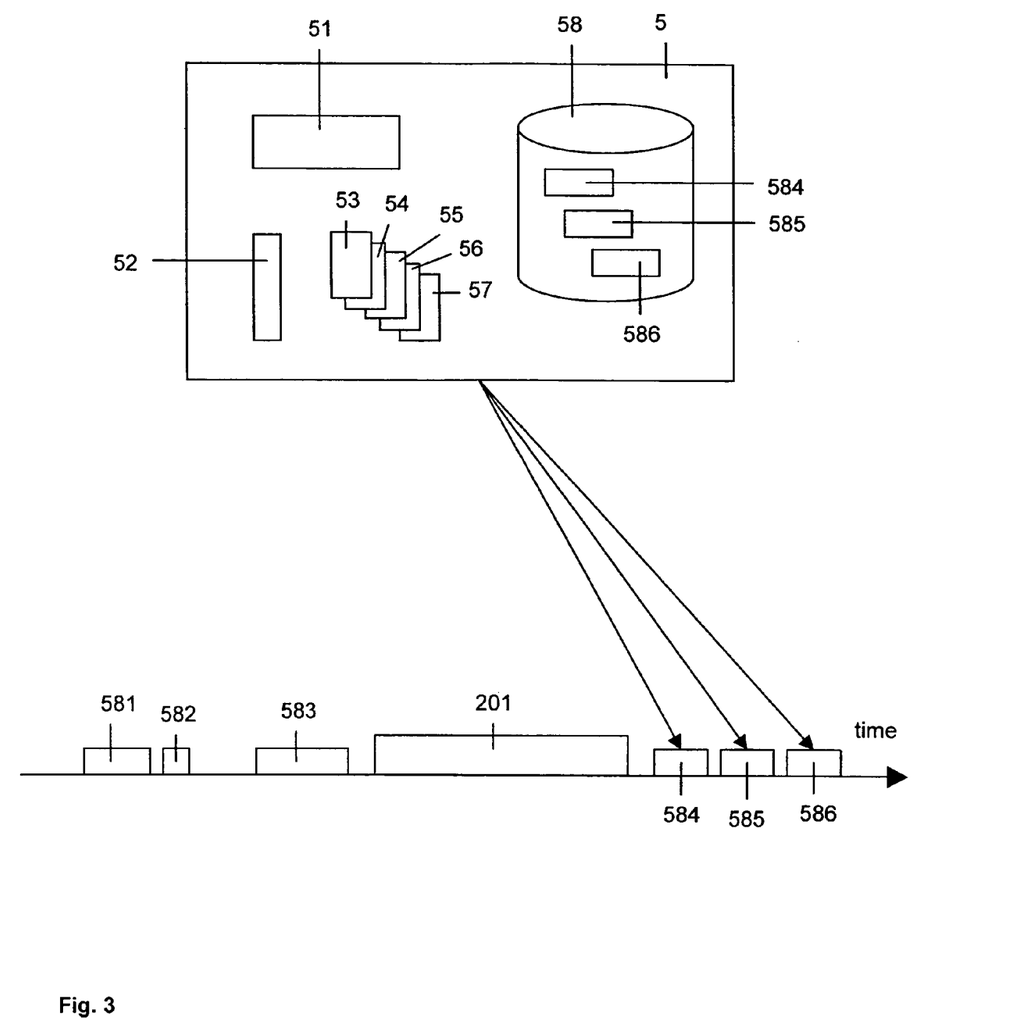
FIG. 3 is a functional view exemplifying the execution of a method according to the present invention.

FIG. 3 illustrates the function of the gateway-server 5 according to the description of FIG. 1 with respect to the handling of other calls during a PTT connection.

The gateway-server 5, as specified with regard to FIG. 1, comprises a control unit 51, an interface unit 52, auxiliary units 53 to 57, and a database 58. It is adapted to support during a PTT connection other calls executed with the same device without losing a talk stream of the connection.

A user may participate in a PTT chat with a telephone connected to a telephone network. During the PTT connection, the gateway-server 5 transmits media streams 581, 582, 583 to the user, as indicated in FIG. 3 by the media stream blocks 581, 582, 583 on the time axis, and simultaneously monitors the telecommunication line of the user, e.g., the telephone number, for other incoming call like, e.g., a telephone call. This may be achieved by a co-operation of the PTT gateway server 5 and a corresponding exchange of the user's telecommunication network.

In case the user is called in a telephone call by a third party, the gateway-server 5 notifies the user of another incoming call, e.g., by a beep signal at the telephone receiver. Then the user can decide whether he wants to suspend the active PTT connection and change over to the telephone call. If he wants to, the gateway-server 5 stops the transmission of media streams to the user and puts through the voice data 201 of the incoming, waiting telephone call to the user.

While the user is answering the call, the gateway-server 5 records and stores all the media streams 584, 585, 586 of the running PTT connection in the database 58 until the participant joins the PTT connection again. After the telephone call has been finished and the transmission of the voice data 201 has been stopped, the gateway-server 5 resumes the transmission of the PTT media streams and sends the stored PTT media streams 584, 585, 586 in the correct chronological order to the user. Thus, the user does not miss any media streams of the current PTT connection. To inform the other PTT participants, a notification will be broadcast when a PTT chat participant enters or leaves a PTT chat.

If the PTT connection ends while the participant is answering the call, the gateway-server 5 records the streams of the PTT connection until the end of the PTT connection. After the call, the user is sent all the stored streams of the PTT connection. If the PTT connection is still active when the user has finished the call and rejoins the PTT connection, the gateway-server 5 will simultaneously record and send media streams, according to the rule "first in—first out" to keep the correct order. In this case the gateway-server 5 will simultaneously record/store and send media streams. The gateway-server 5 will continue recording/storing either until the PTT connection ends or until the PTT participant has caught up with the current PTT connection, i.e., until all media streams stored in the database 58 have been transmitted to the PTT participant and the PTT participant is participating again in the current communication.

It is also possible that the PTT participant decides to skip the recorded media streams stored in the database 58 and to immediately participate in the current communication. This and other navigational preferences within the media streams stored in the database 58 can be indicated by the user to the gateway-server 5.

In a preferred embodiment of the invention, the gateway-server 5 always protocols each PTT connection individually, additionally logging data like the communication content, the connection participants, and the connection start and end time, and stores the data in a memory 58 of the gateway-server 5. Then, any participant which follows with time shift with respect to the other participants is able to retrieve the whole PTT connection data.

The memory/storage function of the gateway-server 5 may also be used to allow individual navigation within the media streams of the whole PTT connection by means of a navigation unit 57. Participants can replay any talk sequences within the connection and can individually set markers at important talk sequences, which they can quickly find to replay the sequence. This feature may be used by traders and lawyers because it allows to negotiate contracts without the necessity that all parties must be available at the same time.

The invention claimed is:

1. A method of providing a Push-to-Talk service within one or more telecommunication networks, wherein the method comprises the steps of: requesting one or more concurrent PTT connections between subscribers of the PTT service; setting up a virtual connection per PTT connection by means of a gateway-server providing the PTT service within a circuit-switched telecommunication network, whereby each virtual connection provides information about the terminals participating in the PTT connection, the service type to reach each terminal, and the connection status of each terminal; generating media streams by a terminal of one of the subscribers of the PTT connection and sending the media streams to the gateway-server; determining the virtual connection corresponding to the received media streams by the gateway-server; sending out the media streams to one or more of the other terminals participating in the PTT connection according to the determined virtual connection; and monitoring a telecommunication connection of one of the terminals participating in the PTT connection for an incoming call and indicating the incoming call to the terminal; transmitting a control command to the PTT gateway-server; interrupting the media streams from/to the terminal upon receiving the control command by the PTT gateway-server; putting through the incoming call to the terminal; and resuming the media streams from/to the terminal upon completion of the call.

2. The method of claim 1, wherein the method comprises the further step of processing and storing the media streams and/or the information provided by the virtual connection by the gateway-server.

3. The method of claim 1, wherein the method comprises the further steps of:
automatically establishing a connection between the gateway-server and a terminal when a subscriber of the PTT service takes off a handset of the terminal or presses a programmed button on the terminal;
executing a subscriber authentication procedure;
providing the terminal with a voice enabled menu for choosing other subscribers of the PTT service and/or for selecting a virtual connection out of two or more concurrent virtual connections assigned to the terminal; and
determining media streams from the terminal by Voice Activity Detection or by means of indicators at the start and end of the media streams.

4. The method of claim 1, wherein the gateway-server provides the PTT service within two or more telecommunication networks based on different technologies, in particular between radio access telecommunication networks and fixed wire-line telecommunication networks or between circuit-switched telecommunication networks and packet-switched telecommunication networks.

5. A gateway-server for providing a Push-to-Talk (PTT) (—PTT~service, wherein the gateway-server comprises: an interface to a circuit-switched telecommunication network; and a control unit for setting up a virtual connection per PTT connection upon a request for one or more concurrent PTT connections between subscribers of the PTT service, whereby each virtual connection provides information about the terminals participating in the PTT connection, the service type to reach each terminal, and the connection status of each terminal, for determining the virtual connection corresponding to media streams received from a terminal of one of the subscribers of the PTT connection, and for sending out the media streams to one or more of the other terminals participating in the PTT connection according to the determined virtual connection; wherein the control unit is adapted to allow individual navigation within the media streams of one or more PTT connections assigned to the subscriber's terminal by assigning individual markers to a sequence of the media streams according to requests received from the subscriber's terminal.

6. The gateway-server of claim 5, wherein the control unit is adapted to handle multiple concurrent PTT connections per subscriber's terminal.

7. The gateway-server of claim 5, wherein the control unit is adapted to allow individual navigation within the media streams of one or more PTT connections assigned to the subscriber's terminal by skipping a sequence of the media streams and/or replaying a sequence of the media stream and/or assigning individual markers to a sequence of the media streams according to requests received from the subscriber's terminal.

8. The gateway-server of claim 5, wherein the control unit is adapted to log and store the media streams provided by the virtual connection as long as a subscriber's terminal is not actively participating in the PTT connection.

9. The gateway-server of claim 5, wherein the control unit is adapted to store the media streams of the PTT connection with a digital signature of one or more of the PTT subscribers participating in the PTT connection, the digital signature indicating the authenticity of the media streams.

10. The method of claim 1, wherein the method comprises the further steps of:

automatically establishing a connection between the gateway-server and a terminal when a subscriber of the PTT service takes off a handset of the terminal or presses a programmed button on the terminal;

executing a subscriber authentication procedure; and determining media streams from the terminal by means of Voice Activity Detection.

11. The method of claim 10 wherein the determining the media streams from the terminal further comprises using a defined voice pre-pause and voice hangover time.

12. A method of providing a Push-to-Talk service within one or more telecommunication networks, wherein the method comprises the steps of: requesting one or more concurrent PTT connections between subscribers of the PTT service; setting up a virtual connection per PTT connection by means of a gateway-server providing the PTT service within a circuit-switched telecommunication network, whereby each virtual connection provides information about the terminals participating in the PTT connection, the service type to reach each terminal, and the connection status of each terminal; generating media streams by a terminal of one of the subscribers of the PTT connection and sending the media streams to the gateway-server; determining the virtual connection corresponding to the received media streams by the gateway-server; sending out the media streams to one or more of the other terminals participating in the PTT connection according to the determined virtual connection; automatically establishing a connection between the gateway-server and a terminal when a subscriber of the PTT service takes off a handset of the terminal or presses a programmed button on the terminal; executing a subscriber authentication procedure; and determining media streams from the terminal by means of indicators provided by the terminal at the start and end of the media streams; and wherein the indicators are a DTMF signal.

13. The method of claim 1, wherein the method comprises the further step of processing and storing the media streams provided by the virtual connection by the gateway-server.

14. The method of claim 10 further comprising the gateway-server simultaneously receiving a plurality of voice data streams from PTT participants.

15. The method of claim 14 further comprising the gateway-server storing the simultaneously received voice data streams and sending them out to the respective destination participants according to the receive time of each stream.

16. The gateway-server of claim 8, wherein the control unit is adapted to log and store the information provided by the virtual connection as long as a subscriber's terminal is not actively participating in the PTT connection.

17. The gateway-server of claim 8 further comprising the gateway-server sending the stored media streams to the subscriber's terminal after it rejoins the PTT connection.

* * * * *